US012705962B2

(12) United States Patent
Basavaraju et al.

(10) Patent No.: US 12,705,962 B2
(45) Date of Patent: Aug. 11, 2026

(54) CONTEXTUAL AUTOMATED AUDIO TALKDOWN FOR REMOTE GUARDING

(71) Applicant: HAKIMO INC., Menlo Park, CA (US)

(72) Inventors: Sateesh Kumar Basavaraju, Bengaluru (IN); Sagar Kashinath Honnungar, Mountain View, CA (US)

(73) Assignee: HAKIMO INC., Menlo Park, CA (US)

( * ) Notice: Subject to any disclaimer, the term of this patent is extended or adjusted under 35 U.S.C. 154(b) by 469 days.

(21) Appl. No.: 18/343,639

(22) Filed: Jun. 28, 2023

(65) Prior Publication Data

US 2025/0006027 A1 Jan. 2, 2025

(51) Int. Cl.
*G08B 13/196* (2006.01)
*G06V 20/52* (2022.01)
*G06V 40/16* (2022.01)
*G08B 3/10* (2006.01)

(52) U.S. Cl.
CPC ....... *G08B 13/19602* (2013.01); *G06V 20/52* (2022.01); *G06V 40/172* (2022.01); *G08B 3/10* (2013.01)

(58) Field of Classification Search
CPC ................ G08B 13/19602; G08B 3/10; G08B 13/19613; G08B 29/186; G06V 20/52; G06V 40/172
See application file for complete search history.

(56) References Cited

U.S. PATENT DOCUMENTS 9,946,711 B2 * 4/2018 Reiter ..................... G08B 5/22
11,115,630 B1 * 9/2021 Lemberger .............. G06F 3/167
11,393,210 B2 7/2022 Felhi et al.
2005/0122397 A1 * 6/2005 Henson .................. H04N 7/188 348/143
2020/0104583 A1 * 4/2020 Zucker ................... G06V 20/10
2020/0364991 A1 * 11/2020 Scalisi ............. G08B 13/19619
2020/0380833 A1 * 12/2020 Kamio ................... G07C 9/253
2022/0083782 A1 * 3/2022 Qian ...................... G06F 18/22
2022/0319288 A1 10/2022 Kraft et al.
2024/0112125 A1 * 4/2024 Wang ..................... G06V 20/41
2024/0331386 A1 * 10/2024 Sawaya ................ G08B 13/196

FOREIGN PATENT DOCUMENTS

KR 20010112180 A 12/2021

OTHER PUBLICATIONS

Qubo Video Doorbell, https://www.quboworld.com/vdb.

* cited by examiner

*Primary Examiner* — Wassim Mahrouka
(74) *Attorney, Agent, or Firm* — CHIP LAW GROUP

(57) ABSTRACT

An electronic device and method for contextual automated audio talkdown for remote guarding is provided. The electronic device detects a movement of an object in a physical area inside or in a vicinity of a built environment and device receives, based on the detected movement, a sequence of images of the physical area that include the object. The electronic device detects physical activities of the object that are associated with a behavior of an intruder based on application of a first AI model on the sequence of images and generates information that includes a textual description of the physical activities. The electronic device generates an audio alert based on the information and controls a playback of the audio alert via an audio reproduction device installed in a vicinity of the built environment. The playback includes a recitation of the textual description included in the information.

18 Claims, 5 Drawing Sheets

CONTEXTUAL AUTOMATED AUDIO TALKDOWN FOR REMOTE GUARDING

CROSS-REFERENCE TO RELATED APPLICATIONS/INCORPORATION BY REFERENCE

None.

FIELD

Various embodiments of the disclosure relate to intruder detection and remote security/surveillance systems. More specifically, various embodiments of the disclosure relate to an electronic device and method for contextual automated audio talkdown for remote guarding.

BACKGROUND

Traditional security systems, such as alarms and deterrence devices, have long been employed to keep intruders out of homes and businesses. Such systems are, however, not always successful at deterring attackers and may sometimes create a false sense of security. Many traditional alarms, for example, can be easily disabled or bypassed by skilled intruders. Similarly, traditional deterrence mechanisms like security cameras or motion sensors may not always be visible or noticeable, so intruders may not even realize they are being watched. Traditional security systems, in addition to their shortcomings, frequently necessitate human supervision, particularly when it comes to monitoring video feeds from security cameras. Unfortunately, human supervision is prone to error, which can result in security breaches.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for contextual automated audio talkdown for remote guarding, is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
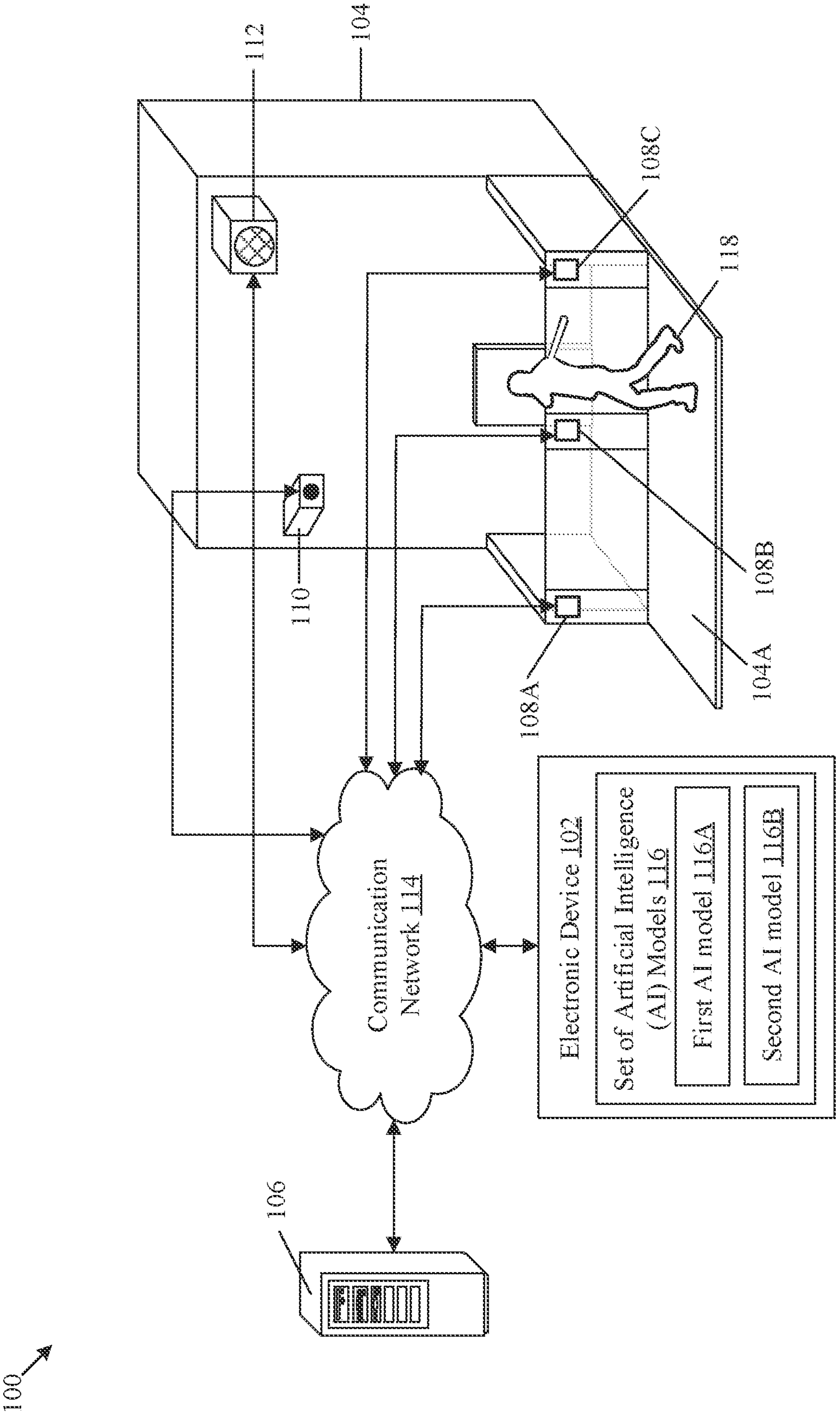
FIG. 1 is a diagram that illustrates an exemplary network environment for contextual automated audio talkdown for remote guarding, in accordance with an embodiment of the disclosure.

The following described implementations may be found in a disclosed electronic device and method for contextual automated audio talkdown for remote guarding. Exemplary aspects of the disclosure provide an electronic device (for example, a server, computing device, a desktop, a laptop, or a personal computer) that may interact with an intruder detection system for contextual automated audio talkdown. The intruder detection system may include motion detectors, image capture devices, and an audio reproduction device. Based on detection of movement in a monitoring area, images or videos of a physical area may be captured. The images may be analyzed by use of one or more machine learning techniques to detect physical activities that may be associated with an intruder behavior. Upon detection of the physical activities, an audio alert may be generated, and the audio reproduction device may be controlled to play the audio alert. The playback may include a recitation of the textual description that may be included in the generated information.

Although traditional security measures like alarms, deterrents, and security cameras have been around for a while, they often fail to keep intruders out. These devices may be simple for intruders to disable or bypass, or they may not even be aware that they are being watched. Additionally, traditional security measures frequently call for human oversight, particularly when it comes to watching security camera video feeds. Unfortunately, human oversight is fallible and can result in security lapses. Due to exhaustion, distraction, or other causes, security staff may overlook crucial information or fail to respond to a security breach in a timely manner. Due to these limitations, there is an increasing need for improved security solutions that can solve these problems and offer trustworthy safety for homes and businesses.

In order to address such issues, the proposed electronic device may use machine learning models to detect physical activities of an object (such as an intruder) in the secured space. The physical activities may be detected based on an application of a machine learning model on the images or frames of the video (captured by the and transmitted by the image capture devices) of the secured space. Thus, human operators may not be required to analyze or verify images and/or videos of the secured space at each instance of their reception to determine an intrusion. The machine learning model may generate an output that may indicate a score of confidence that the detected physical activities are associated with a behavior of an intruder. Thus, an actual intrusion may be reliably ascertained without the need for human analysis of the images/videos. Further, a textual description of the detected physical activities may be generated based on an application of a machine learning model on the output. Based on the generated textual description, a contextually relevant audio message may be generated. The audio message may be a rendering of the textual description. An audio reproduction device installed at the secure space may be controlled to recite the audio message as an audio alert for the object (i.e., the intruder). The audio message may help to discourage further activities of the object in the physical area.

FIG. 1 is a diagram that illustrates an exemplary network environment for contextual automated audio talkdown for remote guarding, in accordance with an embodiment of the disclosure. With reference to FIG. 1, there is shown a network environment 100. The network environment 100 may include an electronic device 102, a built environment 104, a physical space 104*a*, and a server 106. In at least one embodiment, the built environment 104 may include a set of motion detectors 108A . . . 108C, an image capture device 110, and an audio reproduction device 112. The electronic device 102 may communicate with the server 106, the set of motion detectors 108A . . . 108C, the image capture device 110, and/or the audio reproduction device 112, through one or more networks (such as a communication network 114).

In at least one embodiment, the electronic device 102 may store a set of artificial intelligence (AI) models 116. The set of AI models 116 may include a first AI model 116A and a second AI model 116B, for example. There is further shown an object 118 in the vicinity of the built environment 104.

In the built environment 104, the number of motion detectors, image capture devices, and audio reproduction devices is illustrated merely as an example. Such an example should not be construed as limiting the present disclosure. In some embodiments, the built environment 104 may include any number of motion detectors, image capture devices, and audio reproduction devices, without a departure from the scope of the present disclosure.

The electronic device 102 may include suitable logic, circuitry, interfaces, and/or code that may be configured to detect one or more physical activities of the object 118 in a physical space based on images of the physical space received from the image capture device 110. For example, the object 118 may be a person who may be present inside or close to entrance of the built environment 104. If such activities are determined to be associated with a behavior of an intruder, the electronic device 102 may generate an audio alert that may include a description of the detected physical activities and may control a playback of the generated audio alert via the audio reproduction device 112. Examples of the electronic device 102 may include, but are not limited to, a server, a desktop, a tablet, a laptop, a computing device such as a smartphone, a mainframe computer, a computer workstation, or a consumer electronic (CE) device having a display.

The built environment 104 may be a physical structure that may be offered to people to perform various kinds of social, cultural, or economic activities. Examples of the built environment 104 may include, but are not limited to, a residential space (such as an apartment or a house), a commercial space (such as an office space, a hotel room, or a hall), or a particular room or space in a residential or commercial space.

The server 106 may include suitable logic, circuitry, interfaces, and/or code that may be configured to store a sequence of images associated with the built environment 104 or the physical space 104*a*. In at least one embodiment, the first AI model 116A may be hosted on the server 106. The server 106 may receive a request from the electronic device 102 to apply the first AI model 116A on the received sequence of images. Based on the request, the server 106 may apply the first AI model 116A on the sequence of images to detect the physical activities. The server 106 may further apply the second AI model 116B on the detection to generate a textual description of the detected physical activities. The server 106 may be further configured to transmit the detected physical activities of the object 118 and/or the generated textual description to the electronic device 102. The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof.

In at least one embodiment, the server 106 may be implemented as a plurality of distributed cloud-based resources by use of several technologies that are well known to those ordinarily skilled in the art. A person with ordinary skill in the art will understand that the scope of the disclosure is not limited to the implementation of the server 106 and the electronic device 102 as two separate entities. In certain embodiments, the functionalities of the server 106 can be incorporated in its entirety or at least partially in the electronic device 102, without a departure from the scope of the disclosure.

Each motion detector of the set of motion detectors 108A . . . 108C may include suitable logic, circuitry, and/or interfaces that may be configured to detect a movement of an object (such as the object 118) within a detection range of the motion detector. In some embodiments, the motion detector may include an electronic sensor (such as a microwave sensor or an optical sensor) and a transmitter. The electronic sensor may detect a movement based on changes in a microwave field or an optical field within the detection range of the motion detector. The detected changes may correspond to the movement of the object. In some embodiments, the motion detector may be a passive device that may detect the movement based on changes in a temperature within the detection range. Example of sensors that may be included in each of the set of motion detectors 108A . . . 108C may include, but is not limited to, vibration sensors, passive-infrared sensors, microphones, Radio Frequency (RF) sensors, or rotation sensors.

The image capture device 110 may include suitable logic, circuitry, interfaces, and/or code that may be configured to receive control instructions, from the electronic device 102, to capture a sequence of images of a physical area (such as the physical area 104A) that may be outside or inside the built environment 104 and may include the object 118. In some embodiments, the network environment 100 may include a plurality of image capture devices (such as the image capture device 110) at different positions to capture images of the object 118 from multiple viewpoints. The image capture device 110 may be controlled (by the electronic device 102), via the control instructions, to transmit the sequence of images to the electronic device 102. In some embodiments, the movement of the object (such as the object 118) in the physical area (such as the physical area 104A) may be detected based on a raw video feed or a sequence of images of the physical area (i.e., the physical area 104A). In such embodiments, the motion detectors (such as the set of motion detectors 108A . . . 108C) may not be required for the detection of the movement. Examples of the image capture device 110 may include, but are not limited to, an image sensor, a wide-angle camera, an action camera, a closed-circuit television (CCTV) camera, a camcorder, a digital camera, a camera phone, or a night-vision camera.

The audio reproduction device 112 may include suitable logic, interfaces, and/or code that may be configured to play an audio alert that may be generated by the electronic device

102. The audio reproduction device 112 may receive the audio alert and control instructions associated with the playback from the electronic device 102. Examples of the audio reproduction device 112 may include, but are not limited to, a loudspeaker system, a directional loudspeaker, a system consisting of multiple interconnected speakers at different locations in the physical area 104A or the built environment 104, a wireless speaker, and a surround sound system. The audio reproduction device 112 may rely on a wired communication protocol or a wireless communication protocol, such as Wi-Fi, Bluetooth®, or Bluetooth® Low Energy (BLE) to receive the audio alert from the electronic device 102.

The communication network 114 may include a communication medium through which the electronic device 102, the server 106, the set of motion detectors 108A . . . 108C, the image capture device 110, and the audio reproduction device 112 may communicate with each other. The communication network 114 may be a wired communication network or wireless communication network. Examples of the communication network 114 may include, but are not limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 114, in accordance with various wired communication protocols and wireless communication protocols. Examples of such wired communication protocols and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, device to device communication, multi-hop communication, wireless access point (AP), Bluetooth (BT) communication protocols, and cellular communication protocols.

The set of AI models 116 may be a pipeline of machine learning models (for example, the first AI model 116A and the second AI model 116B). In accordance with an embodiment, the first AI model 116A and the second AI model 116B may be pretrained neural networks for activity recognition and text-to-text generation, respectively. A neural network may be referred to as a computational network or a system of artificial neurons which is arranged in a plurality of layers. The plurality of layers of the neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset.

Each node of the neural network may correspond to a mathematical function (e.g., a sigmoid function or a rectified linear unit) with a set of parameters that may be tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same mathematical function or a different mathematical function. In training of the neural network, one or more parameters of each node of the neural network may be updated based on whether an output of the final layer for a given input (from the training dataset) matches a correct result based on a loss function for the neural network. The above process may be repeated for the same input or a different input until a minima of loss function is achieved, and a training error is minimized. Several methods for training are known in art, for example, gradient descent, stochastic gradient descent, batch gradient descent, gradient boost, meta-heuristics, and the like.

Each of the first AI model 116A and the second AI model 116B may include electronic data, which may be implemented as, for example, a software component of an application that is executable on the electronic device 102. Also, each of the first AI model 116A and the second AI model 116B may rely on libraries, external scripts, or other logic or instructions for execution by a processing device. For example, the first AI model 116A may rely on external code or software packages to execute machine learning tasks such as analysis of a sequence of images of a physical area for a detection of objects (such as the object 118), an identification of physical attributes associated with the object 118 (such as a dress color or a facial feature), a determination of scene information associated with the built environment 104, and a detection of one or more physical activities of the object 118 that may be associated with a behavior of an intruder. The neural network in the second AI model 116B may execute machine learning tasks such as generation of textual description of the detected one or more physical activities of the object 118.

Each of the first AI model 116A and the second AI model 116B may be implemented using hardware, including but not limited to, a processor, a microprocessor (e.g., to perform or control performance of one or more operations), a coprocessor (such as a Vision Processing Unit (VPU) or an Inference Accelerator), a field-programmable gate array (FPGA), or an application-specific integrated circuit (ASIC). Alternatively, each of the first AI model 116A and the second AI model 116B may be implemented using a combination of hardware and software.

In operation, the electronic device 102 may be configured to detect a movement of the object 118 in a physical area (such as the physical area 104A). The physical area may be inside or in a vicinity of the built environment 104. For example, if the built environment 104 is a server room or a data center, then the physical area may be an area that is right outside the server room or the data center. Alternatively, the physical area may be a visitor lobby or a publicly accessible space inside the built environment 104 that may be connected to a restricted space in the built environment 104. The movement of the object 118 may be detected based on inputs received from the set of motion detectors 108A . . . 108C. In some scenarios, the physical area may correspond to an area inside the built environment 104. In such scenarios, the set of motion detectors 108A . . . 108C may be placed inside the built environment 104 at different locations such as different entry and exit points of a restricted area in the built environment 104.

Upon detection of the movement (of the object 118), each motion detector of the set of motion detectors 108A . . . 108C may transmit an input to the electronic device 102 and/or the server 106. The inputs may indicate that one or more objects (such as the object 118) are present in the physical area. In accordance with an embodiment, the object 118 may be a person or a vehicle. The object 118 in FIG. 1 is depicted as a person who is outside a building with a bat in hand. The depiction is merely an example, and such an example should be construed as limiting the disclosure.

Based on the detected movement (of the object 118), the electronic device 102 may receive a sequence of images of the physical area 104A that includes the object 118. In accordance with an embodiment, the sequence of images may be received from the image capture device 110 in a response to the detected movement. Additionally, or alternatively, the electronic device 102 may control the image capture device 110 to capture the sequence of images. The image capture device 110 may be controlled based on control instructions that may be prestored or may be received in near real time from the electronic device 102. In accordance with an embodiment, such instructions may specify parameters to configure the image capture device 110. Example of such parameters may include, but is not limited to, a position of the object 118 with respect to a location of the image capture device 110, a change in a camera angle, and a duration for which the image capture device 110 should transmit the sequence of images to the electronic device 102. The control instructions may also include at least one instruction to capture the sequence of images of the physical area 104A such that the object 118 is included in each image of the captured sequence of images. In at least one embodiment, the image capture device 110 may capture a video feed of the physical area 104A for a duration (such as 10 seconds) and the sequence of images may be sampled from the video feed. The control instructions may also instruct the image capture device 110 to transmit the sequence of images to the electronic device 102.

Upon reception of the sequence of images, the electronic device 102 may be further configured to detect one or more physical activities of the object 118 that may be associated with a behavior of an intruder. In general, an intruder may be defined as a person or entity that gains access to or interferes with another's property or rights without permission or authorization. The detection of such activities may be based on application of the first AI model 116A on the received sequence of images. The first AI model 116A may analyze each image of the sequence of images for execution of a set of machine learning tasks. In accordance with an embodiment, the first AI model 116A may be trained to execute one or more tasks, such as but not limited to, an object detection task, a visual attribute extraction task, and an activity recognition task using the received sequence of images. For multiple tasks, the first AI model 116A may be a hybrid network of multiple DNN models, such as a model for object detection, a model for activity recognition, and a model for attribute extraction. Examples of the first AI model 116A may include, but are not limited to, a 2D Convolutional Neural Network (such as VGGNet, ResNet, and Inception), a 3D Convolutional Neural Network (such as C3D, I3D, and P3D), Recurrent Neural Networks (such as Long Short-Term Memory (LSTM) and Gated Recurrent Unit (GRU)), a Two-stream Convolutional Neural Network, or a Transformer-based model.

For the object detection task, the first AI model 116A (i.e., the DNN model) may include a pretrained model for a detection of an object (such as the object 118) as a human or a vehicle in the sequence of images. For example, the DNN model may generate an object detection result that may indicate that the object 118 is a human. The result may include a class score that may indicate that the object 118 belongs to a class "human" (i.e., the class score for label "human" may be "1" (in case of binary classification) or close to "1" (in case a soft label is used)). For other classes, respective class scores may be "0" or close to "0".

For the visual attribute extraction task, the first AI model 116A may include a pretrained model for extraction of one or more visual attributes such as a color, a shape, a text, a pose, or a gait from the sequence of images. Such attributes may be associated with an object (such as the object 118) and may be used to identify the object 118 distinctly amongst other objects in the physical area 104A. If the object 118 is recognized as a person, then such attributes may include bodily features (such as facial features), a type of clothing (such as a cap, a mask, or a type of dress), and a color of clothing (such as a black mask or a green shirt) worn by the person. If the object 118 is recognized as a vehicle, then such attributes may include a type of the vehicle (such as scooter, bike, or car), a model or a make of the vehicle, the license plate number on the vehicle, or a color of the vehicle.

For the activity recognition task, the first AI model 116A may include a pretrained model for extraction of spatiotemporal features from each image of the received sequence of images. From each image of the sequence of images, spatial features and temporal features may be extracted. Based on the extracted spatiotemporal features, one or more physical activities of the object 118 may be detected. By way of example, and not limitation, the physical activity may be an authorized display of arms or weapons in the physical area 104A, an attempt to jump a fence, an attempt to tailgate or influence an authorized person in the physical area 104A, or an unsolicited or unauthorized inspection of item(s) in the physical area 104A. In some instances, the detected one or more physical activities may include an interaction between the object 118 and one or more items in the physical area 104A. For example, the physical activity may include an interaction between the person, (i.e., the object 118) and an item such as an entry gate or a vehicle parked near the entry gate.

In accordance with an embodiment, the electronic device 102 may be configured to determine a true alarm probability (TAP) based on the detected one or more physical activities of the object 118. The TAP may indicate a value of the probability that the detected one or more physical activities are associated with an intruder behavior. The TAP may be higher for certain physical activities and lower for others. For example, TAP may be higher for the activity "attempt to break into the gate" compared to that for an activity "standing near the gate". Similarly, TAP may be set higher for "jumping a fence" or "breaking a lock" compared to that for "opening the gate". The detected physical activity may be determined as associated with an intruder behavior if the TAP is greater than a predefined threshold.

In some scenarios, the value of the TAP may be determined based on multiple physical activities of the object 118. Such determination may be based on a detection that the object 118 is engaged in multiple physical activities in the physical area 104A. For example, based on an application of the first AI model 116A on a received sequence of images, the electronic device 102 may detect that the object 118 opened the gate and is now attempting to break the door to a restricted area of the building (i.e., the built environment 104). In this scenario, the value of TAP may be determined based on the physical activities "opening the gate" and "breaking the door". Based on the value of the TAP, the electronic device 102 may detect that the physical activities "opening the gate" and "breaking the door" may be associated with a behavior of an intruder.

The electronic device 102 may be further configured to generate information that may include a textual description of the detected one or more physical activities. In some embodiments, the information may be generated based on the output of the first AI model 116A, viz., the outcomes of the object detection task, the activity recognition task, and the attribute extraction task. Alternatively, the textual description may be generated based on an application of the second AI model 116B on the outcome of the activity recognition task (i.e., one or more physical activities in which the object 118 is engaged in the physical area 104A). Alternatively, the textual description may be generated based on a text template for a particular type of activity. For example, if a person is identified as having engaged in an activity that caused physical damage to the gate, then the textual description may include a description such as "attempting to break into the gate" for the activity. In accordance with an embodiment, the textual description may be rendered on a display device along with the one or more images of the sequence of images. The images may be rendered to highlight and document the activity of the object 118.

In accordance with an embodiment, the information may also include a description of the recognized one or more attributes of the object 118 and a call or warning to discourage such activities. Thus, the generated information may include the recognized one or more attributes of the object 118, the textual description of the detected one or more physical activities which the object 118 may be engaged in the physical area 104A, and the warning. For example, the generated information may include a message identifying the person in question as wearing a green shirt (i.e., a recognized attribute of the object 118) and attempting to break into the gate (i.e., a textual description of a detected physical activity). The message may include a warning that the person must move away from the gate immediately.

The electronic device 102 may be further configured to generate an audio alert based on the generated information. In accordance with an embodiment, the generated information may be converted into the audio alert. Specifically, the textual description included in the generated information may be converted into an audio message. For example, the textual description "attempting to break into the gate" may be converted into an audio message. In accordance with an embodiment, the electronic device 102 may select an audio template from a set of predefined audio templates. Each audio template may include a set of audio slots that may be filled with audio based on the generated information. The information may be converted to a compatible audio format prior to insertion into the selected audio template.

The set of audio slots may include an audio message slot, an object slot, an attribute slot, and a warning slot, for example. Each of the object slot, the attribute slot, and the warning slot of the audio template may be associated with a specific output of the first AI model 116A or other AI models. For example, the object slot of the selected audio template may be associated with a detection of the object 118 as a person. The attribute slot of the selected audio template may be associated with a color of a shirt (i.e., a recognized attribute of the object 118) worn by the person. The warning slot of the selected audio template may be associated with a detection of a physical activity (i.e., an outcome of the activity recognition task).

By way of example, and not limitation, the selected audio template may be represented as "Object_Field-Attribute_Field-Audio_Message_Field-Warning_Field", i.e., "Person-wearing (insert color of shirt) shirt-You are (insert audio message)-You're attempting to break into the gate. Please move away immediately!". The electronic device 102 may convert "green" (which may be detected as an attribute of the object 118) into an audio format and may insert the color in the attribute slot. Based on such insertions, the generated audio alert may be "Person wearing green shirt. You are attempting to break into the gate. Please move away immediately!". In scenarios where the object is a vehicle, the object slot of the selected audio template may include a name or an identifier of the vehicle, the attribute slot may include a color of the vehicle (such as blue car), the audio message slot may include a short description of the detected physical activity (e.g., an unauthorized parking inside a private property), and the warning slot may include a call to remove the vehicle from the private property.

The electronic device 102 may be further configured to control a playback of the generated audio alert via the audio reproduction device 112 that may be installed in a vicinity of or inside the built environment 104. For example, the audio reproduction device 112 may be installed outside the building (i.e., the built environment 104). The playback may include a recitation of the textual description included in the generated information. The playback may resemble a scenario in which the intruder is warned by a human operator after observing the activities of the intruder.

In some scenarios, human operators may observe the physical area (which may be inside or in a vicinity of the built environment 104) after the playback of the audio alert. The observation may be based on reception of a set of images of the physical area that may be captured by the image capture device 110 after the playback of the audio alert. The electronic device 102 may receive the set of images from the image capture device 110 and the human operators may view such images. The electronic device 102 may be configured to control a display device (for example, a display of the electronic device 102 or a display associated with the electronic device 102) to render a user interface. The user interface may allow the human operators to directly talk with the person or the driver of the vehicle. The user interface may include user interface elements via which the electronic device 102 may receive audio inputs from the human operators. The audio inputs may correspond to audio alerts that may contain a warning or message to refrain from engaging in physical activities or to leave the physical area. Thus, If the intruder does not respond to the generated audio alert, the electronic device 102 provides manual talk-down via the user interface, which can be utilized by human operators to manually issue audio alerts.

Figure 2:
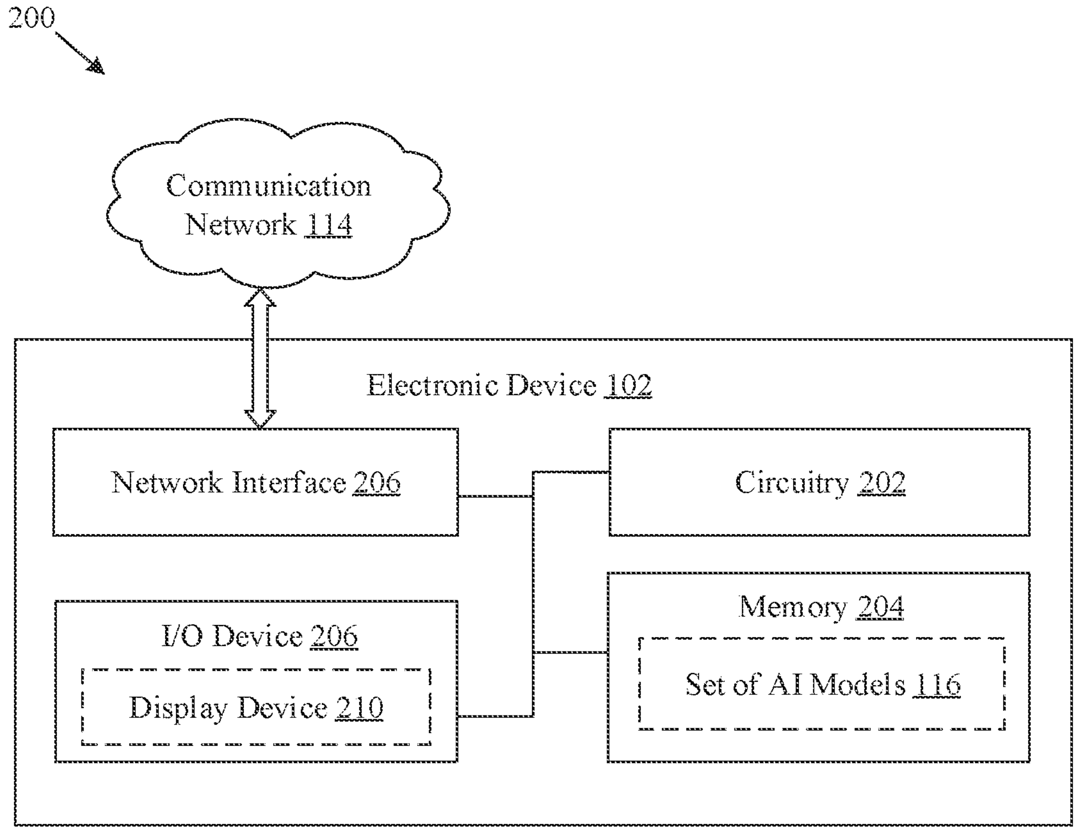
FIG. 2 is a block diagram that illustrates an exemplary electronic device of FIG. 1, for contextual automated audio talkdown, in accordance with an embodiment of the disclosure.

FIG. 2 is a block diagram that illustrates an exemplary electronic device of FIG. 1 for contextual automated audio talkdown, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the memory 204 may include the set of AI models 116 (i.e., the first AI model 116A and the second AI model 116B) as part of a pipeline of models. In at least one embodiment, the I/O device 206 may include a display device 210. The circuitry 202 may be communicatively coupled to the memory 204, the I/O device 206, and the network interface 208, through wired or wireless communication of the electronic device 102.

The circuitry 202 may include suitable logic, circuitry, and interfaces that may be configured to execute program instructions associated with different operations to be executed by the electronic device 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the electronic device 102). In at least one embodiment, the memory 204 may store the sequence of images of the physical area 104A that may include the object 118. The memory 204 may further store an output of the first AI model 116A (i.e., an outcome of an object detection task, an outcome of an activity recognition task, or an outcome of an object attribute extraction task), and an output of the second AI model 116B (i.e., a textual description of the detected one or more physical activities). The memory 204 may further store the audio alert that may be generated based on the generated information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include the display device 210. The display device 210 may include suitable logic, circuitry, and interfaces that may be configured to receive inputs from the circuitry 202 to render, on a display screen, the received sequence of images of the physical area 104A that may include the object 118. The display device 210 may be further configured to render an output of the first AI model 116A as textual information. The rendered textual information may include the detected physical activity in which the object 118 may be engaged in the physical area 104A, a value of TAP that the detected physical activity (in which the object 118 may be engaged in the physical area 104A) is associated with a behavior of an intruder, and a set of attributes associated with the object 118. In at least one embodiment, the display screen may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the server 106, the set of motion detectors 108A . . . 108C, the image capture device 110, and/or the audio reproduction device 112, via the communication network 114. The network interface 208 may be implemented by use of various known technologies to support wired or wireless communication of the electronic device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, and a wireless peer-to-peer protocol.

The functions or operations executed by the electronic device 102, as described in FIG. 1, may be performed by the circuitry 202. Operations executed by the circuitry 202 are described in detail, for example, in FIGS. 3A and 3B.

Figure 3A:
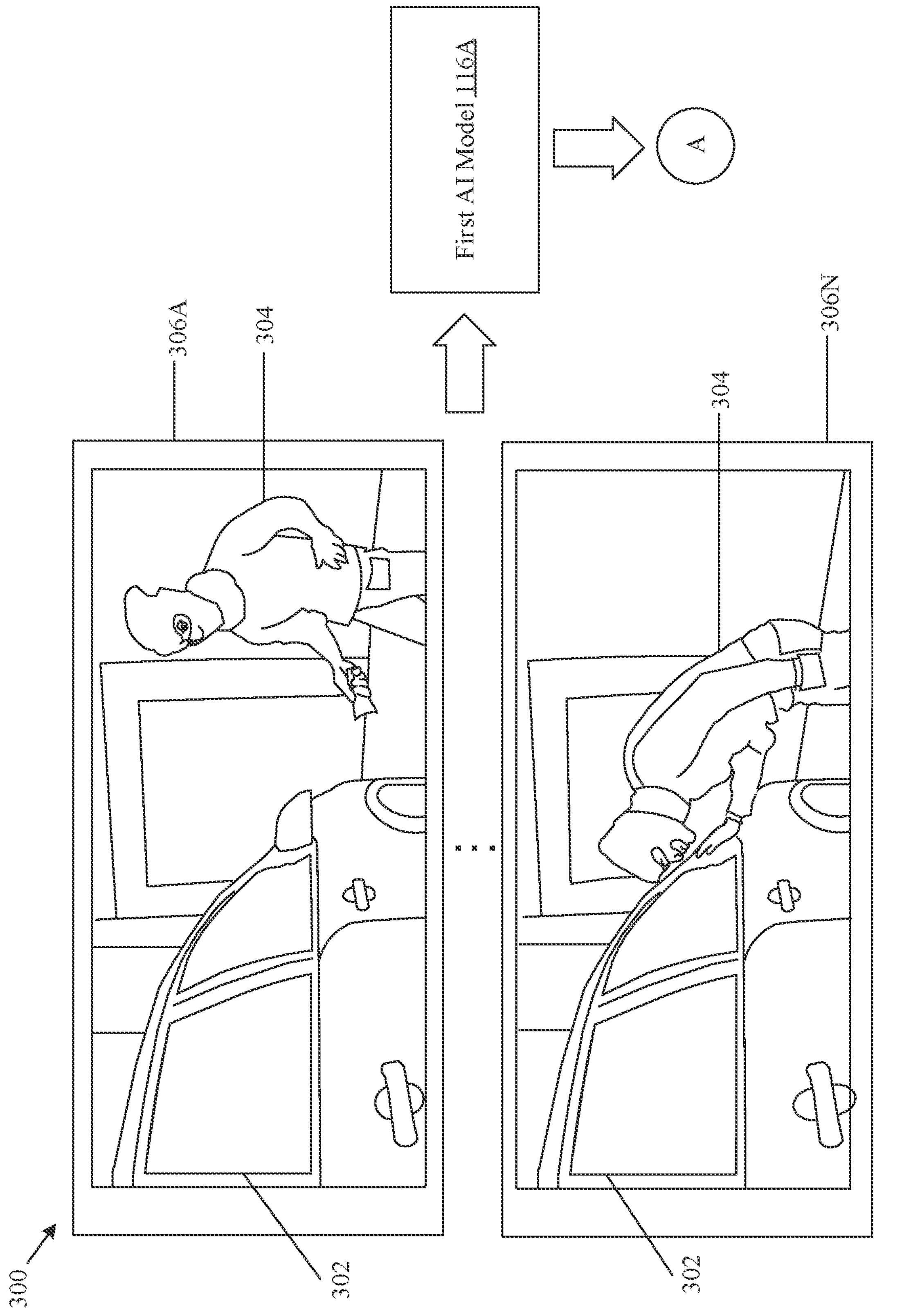
FIGS. 3A and 3B are diagrams that collectively illustrate an exemplary scenario for generation of an audio alert based on detection of a physical activity that may be associated with an intruder behavior, in accordance with an embodiment of the disclosure.
Figure 3B:
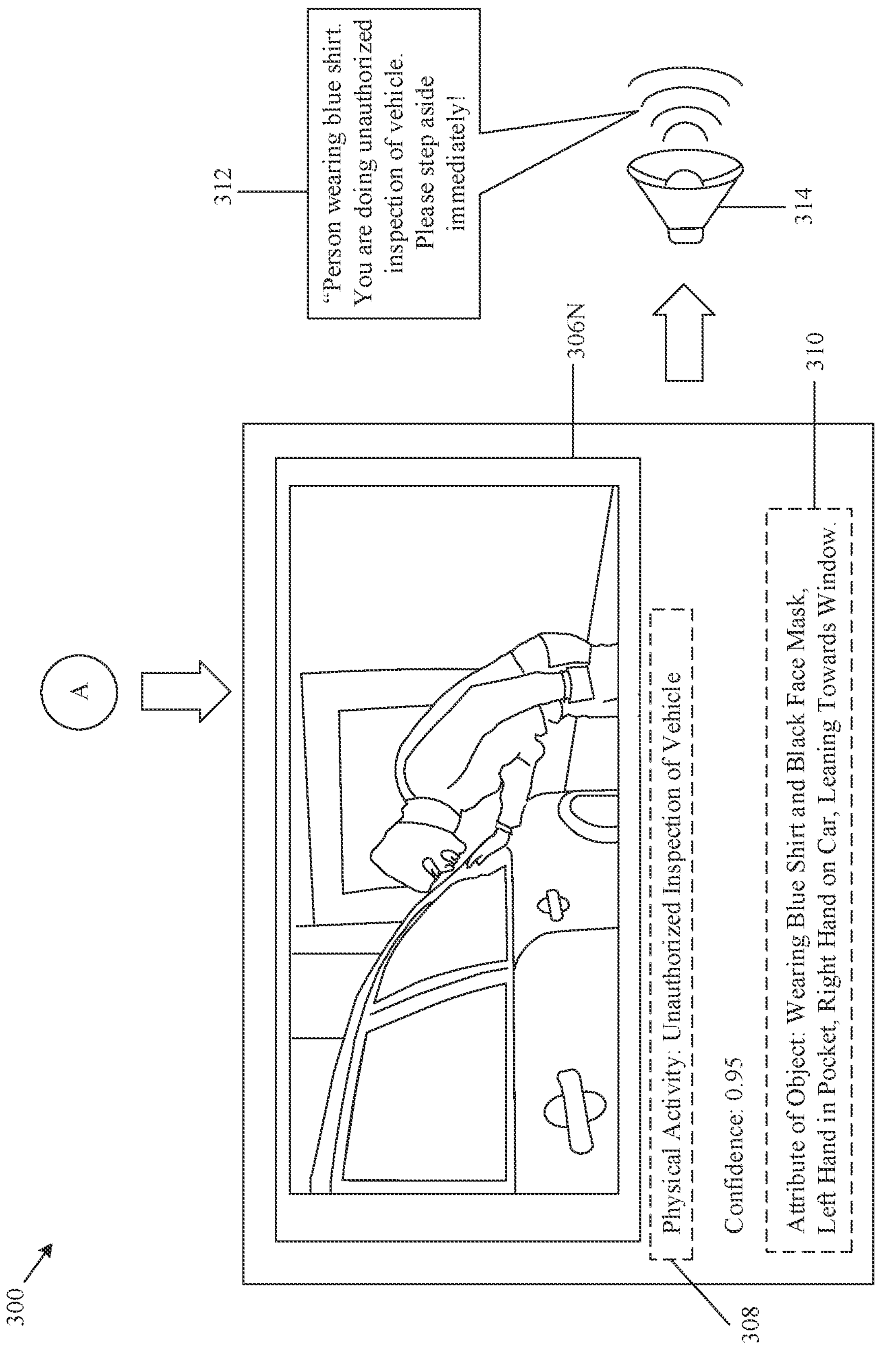

FIGS. 3A and 3B are diagrams that collectively illustrate an exemplary scenario for generation of an audio alert based on a detection of a physical activity that may be associated with an intruder behavior, in accordance with an embodiment of the disclosure. FIG. 3 is explained in conjunction with elements from FIG. 1 and FIG. 2. With reference to FIG. 3, there is shown an exemplary environment 300. The exemplary environment 300 may be a built environment (such as a garage or a parking space) which may include a vehicle 302. There is further shown an object 304 who may be engaged in a physical activity in a physical area that may be inside or in a vicinity of the built environment. The physical activity may include an interaction between the vehicle 302 and the object 304.

At any time-instant, the circuitry 202 may be configured to detect a movement of the object 304 in the physical area. The movement may be detected by use of motion detectors installed in the vehicle 302 or in vicinity of the vehicle 302. Based on the detection, the circuitry 202 may control an image capture device to capture a sequence of images 306A . . . 306N and may transmit the captured sequence of images 306A . . . 306N to the electronic device 102. The image capture device may be installed in the physical area in the vicinity of the vehicle 302. The circuitry 202 may receive the sequence of images 306A . . . 306N from the image capture device and may apply the first AI model 116A on the received sequence of images 306A . . . 306N. Based on such application, the circuitry 202 may detect one or more physical activities that the object 304 may be engaged in. Such activities may be associated with a behavior of an intruder.

In accordance with an embodiment, the circuitry 202 may be configured to recognize the object 304 based on the application of the first AI model 116A on the sequence of images 306A . . . 306N. For example, the object 304 may be recognized as a person. In some scenarios, an object, whose movement is detected in the physical area, may be recognized as a vehicle.

In accordance with an embodiment, the circuitry 202 may be configured to execute one or more of an object detection task and an activity recognition task based on the application of the first AI model 116A on the sequence of images 306A . . . 306N. The object detection task may be executed for the recognition of the object 304 as a person or a vehicle. The detection of the one or more physical activities of the object 304 may be based on the execution of the activity recognition task. For example, it may be detected that the object 304 is engaged in an unauthorized inspection (i.e., a physical activity predicted by the first AI model 116A) of the vehicle 302. In some instances, the detected physical activities may include an interaction between the object 304 and one or more items in the physical area. For example, during unauthorized inspection of the vehicle 302, the object 304 may interact with the vehicle 302 by leaning against the vehicle 302 and attempting to open the vehicle's window or door.

In accordance with an embodiment, the circuitry 202 may be configured to determine a TAP based on the detected one or more physical activities of the object 304. The TAP may be higher for certain physical activities. The detected one or more physical activities of the object 304 may be determined as associated with a behavior of an intruder if the TAP is greater than a predefined threshold. For example, the determined TAP for the physical activity (i.e., unauthorized inspection of the vehicle 302) may be greater than the predefined threshold. Based on such a determination, the circuitry 202 may detect that the unauthorized inspection of the vehicle 302 is associated with the behavior of an intruder. Thus, the object 304 in the sequence of images 306A . . . 306N may be identified as an intruder.

Based on the identification of the object 304 as an intruder, the circuitry 202 may be configured to generate information that may include a textual description of the detected one or more physical activities. In accordance with an embodiment, the circuitry 202 may apply the second AI model 116B on an output of the first AI model 116A to generate the textual description. Alternatively, a text template for the detected activities may be retrieved and updated with label(s) of the detected activities to generate the textual description. The output of the first AI model 116A may include the detected one or more physical activities (i.e., the outcome of the activity recognition task) of the object 304. For example, the circuitry 202 may generate information that includes a textual description 308 (see FIG. 3B) of the detected physical activity (unauthorized inspection of the vehicle 302) based on the application of the second AI model 116B. The second AI model 116B may be a text-to-text generation model (i.e., a language model) that may translate one or more text labels for the activities (includes interaction(s), if any) and object attributes to a natural language description (i.e., the textual description 308) of such labels.

The generated information may further include an indication as to whether the recognized object 304 is a person or a vehicle, one or more attributes 310 of the object 304 that may be recognized, and a warning to discourage such activities. For example, the one or more attributes 310 may include "object is wearing blue shirt and black mask", "left hand is in pocket", "right hand is on car", and "object is leaning towards window". The warning may be "step aside immediately". In accordance with an embodiment, the circuitry 202 may be configured to render the textual description 308 (of the detected physical activity), the determined TAP (i.e., score of confidence that the detected physical activity may be associated with a behavior of an intruder), and the recognized one or more attributes 310.

The circuitry 202 may be further configured to generate an audio alert 312 based on the generated information. For generation of the audio alert 312, the textual description 308 included in the generated information may be converted to an audio message. In accordance with an embodiment, the circuitry 202 may select an audio template from a set of predefined audio templates based on the detected one or more physical activities. Thereafter, the audio message may be inserted in the selected audio template to generate the audio alert 312. Each audio template of the set of predefined audio templates may include a set of audio slots that may be populated based on the generated information. For example, the generated information may be converted into audio clips and inserted into the audio slots of the selected audio template. Based on such insertion of contents of the generated information, the audio alert 312 may be generated.

For example, the generated audio alert 312 may be "Person wearing blue shirt. You are doing unauthorized inspection of vehicle. Step aside immediately!". In the audio alert 312, "person" may correspond to an object slot, "wearing blue shirt" may correspond to an attribute slot, "you are doing unauthorized inspection of vehicle" may correspond to a slot for the activity, and "step aside immediately" may correspond to a warning slot.

The circuitry 202 may be further configured to control a playback of the audio alert 312 via an audio reproduction device 314 that may be installed in a vicinity of or inside the built environment. The playback may include a recitation of the text included in the generated information.

In accordance with an embodiment, the circuitry 202 may be configured to determine the object 304 as a person based on the received sequence of images 306A . . . 306N. In accordance with an embodiment, the determination of the object 304 as a person may be performed based on an application of the first AI model 116A on the received sequence of images 306A . . . 306N. The circuitry 202 may be further configured to extract a set of features of the person from the received sequence of images 306A . . . 306N. The extracted set of features may depend on recognition of the object 304 as a person or a vehicle. The extracted features may include, for example, facial features, height, body type, and so on. For a vehicle, the extracted features may include a type of the vehicle, a model of the vehicle, a color of the vehicle, a license plate number of the vehicle, and so on. Thereafter, the circuitry 202 may classify the person (i.e., the object 304) as a whitelisted person, a blacklisted person, or an unrecognized person based on whether the extracted set of features is present in a feature database. The memory 204 may store the feature database that may include features of whitelisted persons and blacklisted persons. The extracted set of features may be compared with features in the feature database. Based on such a comparison, the person may be classified as a whitelisted, blacklisted, or unrecognized person. After the classification, the audio alert 312 may be generated based on a determination that the person (i.e., the object 304) is classified as a blacklisted person or an unrecognized person.

In accordance with an embodiment, the circuitry 202 may be configured to detect one or more instances of a damage to a property that may include the physical area and the built environment, based on application of a third AI model on the sequence of images 306A . . . 306N. The third AI model may be a DNN model which may be trained using a training dataset that includes a set of images. The set of images may depict various types of damage caused to various types of properties by intruders. The third AI model may generate an output that may indicate that damage has been inflicted to the property (i.e., the vehicle 302) based on analysis of the sequence of images 306A . . . 306N. For example, the property may include the vehicle 302 in the physical area. The damage to the property (i.e., vehicle 302) may be caused by the person (i.e., the object 304) or another vehicle. The detection of the one or more instances of the damage may be triggered based on detection of one or more physical activities of the object 304 that may be associated with a behavior of an intruder. For example, if it is determined that the object 304 caused damage to the vehicle 302 or any of its components, the detection may be activated.

Once one or more instances of damage to the property are detected, the circuitry 202 may control a display device (such as the display device 210) associated with a user of the built environment to render images (of the sequence of images 306A . . . 306N) that may include the detected one or more instances of the damage. The circuitry 202 may further generate information that may include a description of the detected one or more instances of the detected damage to the property. In accordance with an embodiment, the description may be generated based on an application of the second AI model 116B on the rendered images. The circuitry 202 may generate an audio alert based on the description of the detected one or more instances of damage. The description may be converted into an audio message and inserted into an audio template (which may be selected from the set of predefined audio templates) for the generation of the audio alert. Thereafter, the circuitry 202 may control a playback of the audio alert via the audio reproduction device 314.

Figure 4:
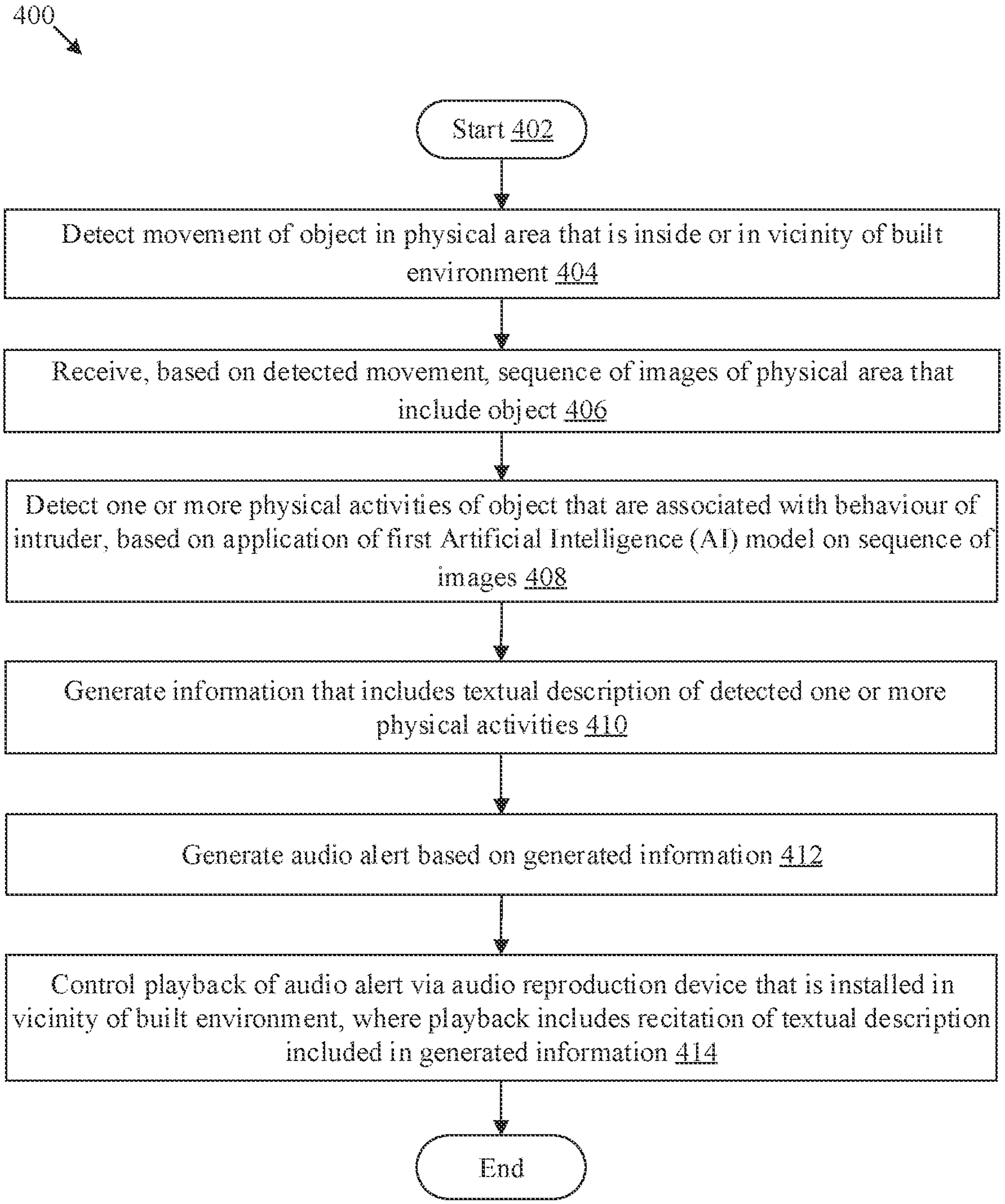
FIG. 4 is a flowchart that illustrates operations for an exemplary method for contextual automated audio talkdown for remote guarding, in accordance with an embodiment of the disclosure.

FIG. 4 is a flowchart that illustrates operations for an exemplary method for contextual automated audio talkdown for remote guarding, in accordance with an embodiment of the disclosure. FIG. 4 is explained in conjunction with elements from FIGS. 1, 2, 3A, and 3B. With reference to FIG. 4, there is shown a flowchart 400. The operations from 402 to 414 may be implemented by any computing system, such as, by the electronic device 102 of FIG. 1. The operations may start at 402 and may proceed to 404.

At 404, a movement of an object (such as the object 118) in the physical area that may be inside or in a vicinity of a built environment (such as the built environment 104) may be detected. In at least one embodiment, the circuitry 202 may be configured to detect the movement of the object 118 in the physical area that may be inside or in a vicinity of the built environment 104. The details of detection of the movement of the object 118 in the physical area, are described, for example, in FIG. 1 and FIG. 3A.

At 406, a sequence of images of the physical area that includes the object 118 may be received based on the detected movement. In at least one embodiment, the circuitry 202 may be configured to receive, based on the detected movement, the sequence of images of the physical area that include the object 118. The details of reception of the sequence of images of the physical area are described, for example, in FIG. 1 and FIG. 3A.

At 408, one or more physical activities of the object 118 that may be associated with a behavior of an intruder may be detected based on the application of the first AI model 116A on the sequence of images. In at least one embodiment, the circuitry 202 may be configured to detect one or more physical activities of the object 118 that may be associated with a behavior of the intruder. The circuitry 202 may be further configured to determine a TAP based on the detected one or more physical activities of the object 118. The one or more physical activities may include an interaction between the object 118 and one or more items in the physical area. The details of detection of the one or more physical activities of the object 118 are described, for example, in FIG. 1, FIG. 3A, and FIG. 3B.

At 410, information that may include a textual description of the detected one or more physical activities may be generated. In at least one embodiment, the circuitry 202 may be configured to generate the information that may include the textual description of the detected one or more physical activities. The circuitry 202 may be further configured to apply the second AI model 116B on an output of the first AI model 116A to generate the textual description. The output may include the detected one or more physical activities of the object 118. The details of generation of the information including the textual description are described, for example, in FIG. 1 and FIG. 3B.

At 412, an audio alert may be generated based on the generated information. In at least one embodiment, the circuitry 202 may be configured to generate the audio alert based on the generated information. The circuitry 202 may be further configured to convert the textual description to an audio message, select an audio template from a set of predefined audio templates based on the detected one or more physical activities, and insert the audio message in the selected audio template to generate the audio alert. The details of generation of the audio alert are described, for example, in FIG. 1 and FIG. 3B.

At 414, a playback of the audio alert via an audio reproduction device (such as the audio reproduction device 112) may be controlled. In at least one embodiment, the circuitry 202 may be configured to control the playback of the audio alert via the audio reproduction device 112 that may be installed in the vicinity of the built environment 104. The playback may include a recitation of the textual description included in the generated information. The details of control of the playback of the audio alert via the audio reproduction device 112 are described, for example, in FIG. 1 and FIG. 3B. Control may pass to end.

Although the flowchart 400 is illustrated as discrete operations, such as 404, 406, 408, 410, 412, and 414, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include detection of a movement of an object (such as the object 118) in a physical area that may be inside or in a vicinity of a built environment (such as the built environment 104). The operations may further include reception, based on the detected movement, a sequence of images of the physical area that may include the object 118. The operations may further include detection of one or more physical activities of the object 118 that may be associated with a behavior of an intruder, based on application of the first AI model 116A on the sequence of images. The operations may further include generation of information that may include a textual description of the detected one or more physical activities. The operations may further include generation of an audio alert based on the generated information. The operations may further include control of a playback of the audio alert via an audio reproduction device (such as the audio reproduction device 112) that may be installed in a vicinity of the built environment 104. The playback may include a recitation of the textual description included in the generated information.

Exemplary aspects of the disclosure may include an electronic device (such as, the electronic device 102 of FIG. 1) that may include circuitry (such as, the circuitry 202), that may be communicatively coupled to the electronic device (such as, the electronic device 102 of FIG. 1). The circuitry 202 may be configured to detect a movement of an object (such as the object 118) in a physical area that is inside or in a vicinity of a built environment (such as the built environment 104). The circuitry 202 may be configured to receive, based on the detected movement, a sequence of images of the physical area that may include the object 118. The circuitry 202 may be configured to detect one or more physical activities of the object 118 that may be associated with a behavior of an intruder, based on application of the first AI model 116A on the sequence of images. The circuitry 202 may be configured to generate information that may include a textual description of the detected one or more physical activities. The circuitry 202 may be configured to generate an audio alert based on the generated information. The circuitry 202 may be configured to control a playback of the audio alert via an audio reproduction device (such as the audio reproduction device 112) that may be installed in a vicinity of the built environment 104. The playback may include a recitation of the textual description included in the generated information.

The present disclosure may be realized in hardware, or a combination of hardware and software. The present disclosure may be realized in a centralized fashion, in at least one computer electronic device, or in a distributed fashion, where different elements may be spread across several interconnected computer electronic devices. A computer electronic device or other apparatus adapted for carrying out the methods described herein may be suited. A combination of hardware and software may be a general-purpose computer electronic device with a computer program that, when loaded and executed, may control the computer electronic device such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer electronic device is able to carry out these methods. Computer program, in the present context, means any expression, in any language, code or notation, of a set of instructions intended to cause an electronic device with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry configured to:
detect a movement of an object in a physical area that is inside or in a vicinity of a built environment;
receive, based on the detected movement, a sequence of images of the physical area that include the object;
detect one or more physical activities of the object that are associated with a behavior of an intruder, based on application of a first Artificial Intelligence (AI) model on the sequence of images;
generate information that includes a textual description of the detected one or more physical activities, wherein the generation of the information including the textual description is based on application of a second AI model on an output of the first AI model, and the second AI model is configured to translate one or more text labels for the detected one or more physical activities and one or more attributes of the object to a natural language description;
generate an audio alert based on the generated information, wherein the generation of the audio alert comprises:
converting the textual description to an audio message;
selecting an audio template from a set of audio templates based on the detected one or more physical activities, wherein
the selected audio template includes a set of audio slots, and
the set of audio slots includes an object slot associated with a type of the object, an attribute slot associated with the one or more attributes of the object, and a warning slot associated with the detection of the one or more physical activities; and
inserting the audio message in a corresponding audio slot of the set of audio slots of the selected audio template; and
control a playback of the audio alert via an audio reproduction device that is installed in a vicinity of the built environment, wherein the playback includes a recitation of the textual description included in the generated information.

2. The electronic device according to claim 1, wherein the circuitry is further configured to determine a true alarm probability (TAP) based on the detected one or more physical activities of the object.

3. The electronic device according to claim 1, wherein the circuitry is further configured to recognize the object based on the application of the first AI model on the sequence of images, wherein the object is recognized as a person or a vehicle.

4. The electronic device according to claim 1, wherein the circuitry is further configured to execute one or more of an object detection task and an activity recognition task based on an application of the first AI model on the sequence of images, wherein the detection of the one or more physical activities of the object is based on the execution, and the one or more physical activities include an interaction between the object and one or more items in the physical area.

5. The electronic device according to claim 1, wherein the output of the first AI model includes the detected one or more physical activities of the object.

6. The electronic device according to claim 1, wherein the circuitry is further configured to:

determine, based on the received sequence of images, the object as a person;

extract a set of features of the person from the received sequence of images; and classify the person as one of a whitelisted person, a blacklisted person, or an unrecognized person based on whether the extracted set of features is present in a feature database, wherein the audio alert is generated based on a determination that the person is classified as one of the blacklisted person or the unrecognized person.

7. The electronic device according to claim 1, wherein the circuitry is further configured to:

detect one or more instances of a damage to a property that includes the physical area and the built environment, based on application of a third AI model on the sequence of images; and control a display device associated with a user of the built environment to render images that include the detected one or more instances of the damage, wherein the generated information includes a description of the detected one or more instances, and the audio alert is generated further based on the description of the detected one or more instances.

8. A method comprising:

in an electronic device:

detecting a movement of an object in a physical area that is inside or in a vicinity of a built environment;

receiving, based on the detected movement, a sequence of images of the physical area that include the object;

detecting one or more physical activities of the object that are associated with a behavior of an intruder, based on application of a first Artificial Intelligence (AI) model on the sequence of images;

generating information that includes a textual description of the detected one or more physical activities, wherein the generation of the information including the textual description is based on application of a second AI model on an output of the first AI model, and the second AI model is configured to translate one or more text labels for the detected one or more physical activities and one or more attributes of the object to a natural language description;

generating an audio alert based on the generated information, wherein the generation of the audio alert comprises:

converting the textual description to an audio message;

selecting an audio template from a set of audio templates based on the detected one or more physical activities, wherein the selected audio template includes a set of audio slots, and the set of audio slots includes an object slot associated with a type of the object, an attribute slot associated with the one or more attributes of the object, and a warning slot associated with the detection of the one or more physical activities; and inserting the audio message in a corresponding audio slot of the set of audio slots of the selected audio template; and controlling a playback of the audio alert via an audio reproduction device that is installed in a vicinity of the built environment, wherein the playback includes a recitation of the textual description included in the generated information.

9. The method according to claim 8, further comprising determining a true alarm probability (TAP) based on the detected one or more physical activities of the object.

10. The method according to claim 8, further comprising recognizing the object based on the application of the first AI model on the sequence of images, wherein the object is determined as a person or a vehicle.

11. The method according to claim 8, further comprising executing one or more of an object detection task and an activity recognition task based on an application of the first AI model on the sequence of images, wherein the detection of the one or more physical activities of the object is based on the execution, and the one or more physical activities include an interaction between the object and one or more items in the physical area.

12. The method according to claim 8, wherein the output of the first AI model includes the detected one or more physical activities of the object.

13. The method according to claim 8, further comprising:

determining, based on the received sequence of images, the object as a person;

extracting a set of features of the person from the received sequence of images; and classifying the person as one of a whitelisted person, a blacklisted person, or an unrecognized person based on whether the extracted set of features is present in a feature database, wherein the audio alert is generated based on a determination that the person is classified as one of the blacklisted person or the unrecognized person.

14. The method according to claim 8, further comprising:

detecting one or more instances of a damage to a property that includes the physical area and the built environment, based on application of a third AI model on the sequence of images; and controlling a display device associated with a user of the built environment to render images that include the detected one or more instances of the damage, wherein the generated information includes a description of the detected one or more instances, and the audio alert is generated further based on the description of the detected one or more instances.

15. A non-transitory computer-readable storage medium having stored thereon, computer-executable instructions that when executed by an electronic device, causes the electronic device to execute operations, the operations comprise:

detecting a movement of an object in a physical area that is inside or in a vicinity of a built environment;

receiving, based on the detected movement, a sequence of images of the physical area that include the object;

detecting one or more physical activities of the object that are associated with a behavior of an intruder, based on application of a first Artificial Intelligence (AI) model on the sequence of images;

generating information that includes a textual description of the detected one or more physical activities, wherein the generation of the information including the textual description is based on application of a second AI model on an output of the first AI model, and the second AI model is configured to translate one or more text labels for the detected one or more physical activities and one or more attributes of the object to a natural language description;

generating an audio alert based on the generated information, wherein the generation of the audio alert comprises:

converting the textual description to an audio message;

selecting an audio template from a set of audio templates based on the detected one or more physical activities, wherein the selected audio template includes a set of audio slots, and the set of audio slots includes an object slot associated with a type of the object, an attribute slot associated with the one or more attributes of the object, and a warning slot associated with the detection of the one or more physical activities; and inserting the audio message in a corresponding audio slot of the set of audio slots of the selected audio template; and controlling a playback of the audio alert via an audio reproduction device that is installed in a vicinity of the built environment, wherein the playback includes a recitation of the textual description included in the generated information.

16. The non-transitory computer-readable storage medium according to claim 15, wherein the operations further comprise determining a true alarm probability (TAP) based on the detected one or more physical activities of the object.

17. The non-transitory computer-readable storage medium according to claim 15, wherein the operations further comprise recognizing the object based on the application of the first AI model on the sequence of images, wherein the object is recognized as a person or a vehicle.

18. The non-transitory computer-readable storage medium according to claim 15, wherein the operations further comprise executing one or more of an object detection task and an activity recognition task based on an application of the first AI model on the sequence of images, wherein the detection of the one or more physical activities of the object is based on the execution, and the one or more physical activities include an interaction between the object and one or more items in the physical area.

* * * * *